United States Patent [19]

Bose et al.

[11] Patent Number: 5,008,939
[45] Date of Patent: Apr. 16, 1991

[54] AM NOISE REDUCING

[75] Inventors: Amar G. Bose, Wayland; William R. Short, Wellesley, both of Mass.

[73] Assignee: Bose Corporation, Framingham, Mass.

[21] Appl. No.: 387,504

[22] Filed: Jul. 28, 1989

[51] Int. Cl.⁵ .............................................. H04H 5/00
[52] U.S. Cl. ..................................................... 381/15
[58] Field of Search ............................ 381/15, 16, 13; 455/203

[56] References Cited

U.S. PATENT DOCUMENTS

| | | |
|---|---|---|
| 3,218,393 | 11/1965 | Kahn . |
| 4,018,994 | 4/1977 | Kahn . |
| 4,192,970 | 3/1980 | Kahn . |
| 4,206,317 | 6/1980 | Kahn . |
| 4,489,431 | 12/1984 | Ecklund ................................ 381/15 |
| 4,641,341 | 2/1987 | Kahn ..................................... 329/146 |
| 4,653,095 | 3/1987 | Kahn ..................................... 381/15 |
| 4,680,795 | 7/1987 | Ecklund ................................ 381/15 |

FOREIGN PATENT DOCUMENTS

0236218 10/1987 Japan ..................... 455/203

Primary Examiner—Forester W. Isen
Attorney, Agent, or Firm—Fish & Richardson

[57] ABSTRACT

A receiver for receiving an amplitude modulated signal with upper and lower sidebands, comprising: an independent sideband decoder for providing demodulated upper and lower sideband audio signals, a combiner for differentially combining the upper and lower sideband audio signals to provide a noise signal, a quality detector apparatus for providing upper and lower quality signals representative of undesired noise in the upper and lower sideband audio signals respectively, and a selector responsive to the quality signals for processing the upper and lower sideband audio signals to provide an output audio signal with reduced noise. The quality detector includes a correlator for correlating the noise and audio signal in the associated sideband to provide the quality signals. In another aspect of the invention, the receiver also comprises a plurality of band-pass filters for selectively transmitting spectral components of the upper and lower sideband audio signals in contiguous frequency bands, a corresponding plurality of said combiners, and a summer for summing the output audio signals provided by said selectors. The quality detectors and the selectors are associated with a respective band pass filter.

31 Claims, 9 Drawing Sheets

AM NOISE REDUCING

BACKGROUND OF THE INVENTION

This invention relates to the reception of low frequency information amplitude modulating a high frequency carrier.

Amplitude modulation (AM) broadcast channel assignments set the frequency spacing between carrier frequencies of adjacent channels at 10 kHz, thus allowing each channel a 10 kHz bandwidth. The bandwidth for an AM double sideband signal is twice the bandwidth of the modulating signal. For example, if an AM carrier frequency is $F_c$ and the highest modulating frequency is $F_m$, the bandwidth of the AM signal embraces lower and upper sidebands in the frequency range of $F_c-F_m$ to $F_c+F_m$. To reduce interference of wide bandwidth transmissions, assigned AM channels in a local area are widely spaced. However, when transmission conditions are favorable, such as at night, distant AM signals can easily interfere with local signals. Interference of this type usually results in a 10 kHz whistle corresponding to the beat frequency with the carrier of the interfering station. To reduce audibility of this whistle, AM receivers typically include a filter cutting off audio frequencies above 3 kHz after the demodulation stage or in the IF amplifier. This filter prevents reproduction of higher spectral components, which are desired for high fidelity. Therefore, the receiver reduces the fidelity advantages of a wide bandwidth transmission.

The modulated signal can be recovered from either sideband. Single sideband (SSB) receivers allow selection of either sideband to reduce noise. Other AM receivers demodulate the sidebands separately and add the resulting demodulated signals. Still other AM receivers have 10 kHz bandpass filters on each sideband to detect the carrier of interfering stations, and provide variable band-reject filters for reducing the high frequency noise in sidebands adjacent to an interfering channel.

Stereophonic AM systems transmit signals with different spectral distributions in the two sidebands. Kahn (U.S. Pat. Nos. 3,218,393, 4,018,994, 4,641,341) and Ecklund (U.S. Pat. No. 4,489,431) disclose different AM stereo systems. The former system transmits left and right stereo information separately in the two sidebands. The latter system (the CQUAM stereo system) amplitude and phase modulates the carrier with the sum, and difference, respectively, of the stereo signals. Both of these stereo systems also modulate the carrier with a low frequency pilot tone, which indicates the presence of a stereo transmission. Kahn and Ecklund disclose using this pilot tone to reduce the effect of interference from neighboring channels through variable band-reject filters and channel mixing.

SUMMARY OF THE INVENTION

The invention generally features a receiver for receiving an amplitude modulated double-sideband signal which is subject to interference, this receiver generally comprising: a sideband demodulator for separate demodulation of the upper and lower sideband signals; a quality detector detecting the quality of the upper and lower sideband signals to provide a quality signal indicative of the amount of interference on each sideband; and a selector responsive to the quality signal for providing a selected output signal derived from at least one demodulated sideband signal. Preferably, the quality detector includes a correlator to measure more accurately the amount of interference in each sideband.

The invention further features embodiments of the quality detector including high pass filters coupled to each sideband demodulator for providing upper and lower sideband noise signals, a noise comparator for comparing the sideband signals to identify the sideband having the lesser noise, and low pass filters for filtering the output of the correlator.

The invention further generally features an embodiment of the selector comprising a plurality of variable gain amplifiers for amplifying selected components of the demodulated sideband signals and a summer for combining the amplified selected components provided by the variable gain amplifiers, where the quality signal controls the gains of the variable gain amplifiers.

The invention further generally features logic elements responsive to the quality signal for instantaneously controlling the gains, and integrators for converting the logic signals from the logic elements into analog control signals.

The invention further generally features variable bandpass filters responsive to the control signals for selectively filtering the sideband signals.

According to the invention, there is a receiver for receiving an amplitude modulated signal with upper and lower sidebands carrying a modulating audio signal. The receiver has independent sideband circuitry for providing at least one of upper and lower sideband signals, a quality detector and a selector. The quality detector provides a quality signal representative of undesired noise in the upper sideband signal relative to that in the lower sideband signal. The selector is responsive to the quality signal for processing that one of only the upper sideband signal, only the lower sideband signal and both the upper and lower sideband signals to provide an audio output signal with reduced noise that is a substantially faithful reproduction of the modulating audio signal.

According to the invention, the method of receiving an amplitude modulated signal with upper and lower sidebands carrying a modulating audio signal includes processing the amplitude modulated signal to provide at least one of upper and lower sideband signals and a quality signal representative of undesired noise in the upper sideband signal relative to that in the lower sideband signal, and processing that one of only the upper sideband signal, only the lower sideband signal and both the upper and lower sideband signals to provide an audio output signal with reduced noise that is a substantially faithful reproduction of the modulating audio signal. The process may also include demodulating the upper and lower sideband signals to provide upper and lower sideband audio signals, differentially combining the demodulated upper and lower sideband audio signals to provide a noise signal, and correlating the noise signal and the demodulated sideband audio signal in the associated sideband to provide the quality signal.

The invention further generally features a stereo pilot tone detector, where the logic elements are also responsive to the detected pilot signal to provide left and right stereo signals.

The invention also generally features a plurality of band-pass filters for decomposing the upper and lower sidebands into several contiguous pass bands, and processing circuitry as described above for each pass band.

Other features and advantages will become apparent from the following detailed description when read in connection with the accompanying drawings in which:

STRUCTURE

Figure 1:
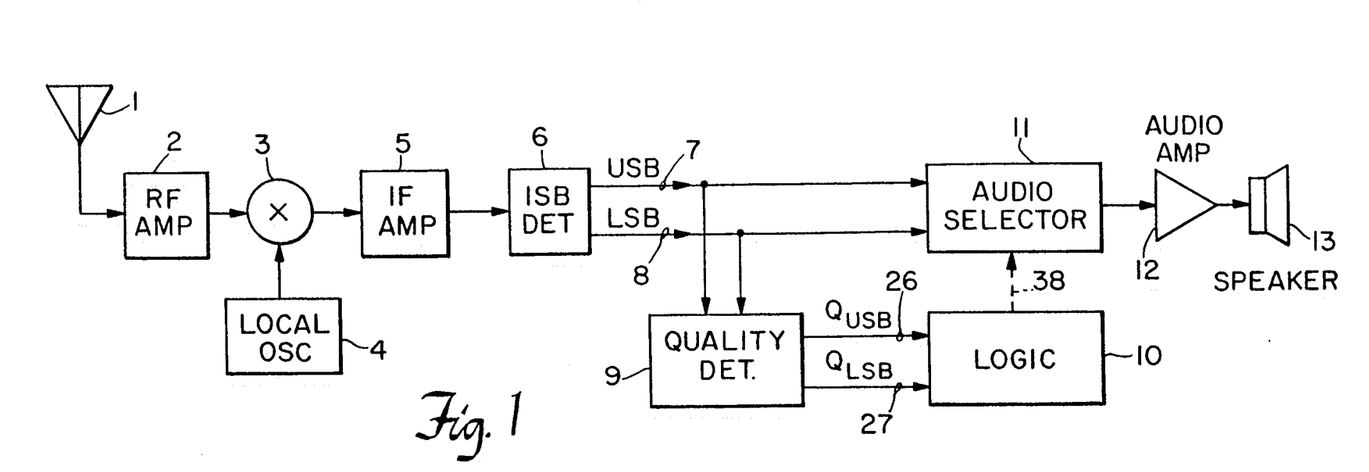
FIG. 1 is a block diagram of a monophonic receiver according to the invention.

Referring to FIG. 1, there is shown a block diagram of an embodiment of a monophonic receiving system in accordance with the invention. This receiving system comprises antenna 1 connecting to radio frequency amplifier 2. The output of radio frequency amplifier 2 is connected to mixer 3. The other input of mixer 3 is connected to local oscillator 4. The output of mixer 3 is connected to intermediate frequency amplifier 5. The output of the intermediate frequency amplifier 5 is connected to independent sideband detector 6. The outputs of independent sideband detector 6 are the upper and lower sideband audio signals on lines 7 and 8, respectively. Upper sideband audio signal on line 7 is connected to audio selector 11 and to quality detector 9. Lower sideband audio signal on line 8 is also connected to audio selector 11 and to quality detector 9. The outputs of quality detector 9 are upper and lower quality signals on lines 26 and 27, which are representative of the quality of the upper sideband signal on line 7 and the lower sideband signal on line 8, respectively. These quality signals are fed to logic element 10. Logic element 10 provides control signals on lines 38 which control audio selector 11. The output of the audio selector 11 is connected to the audio amplifier 12 which drives loudspeaker 13.

Figure 2:
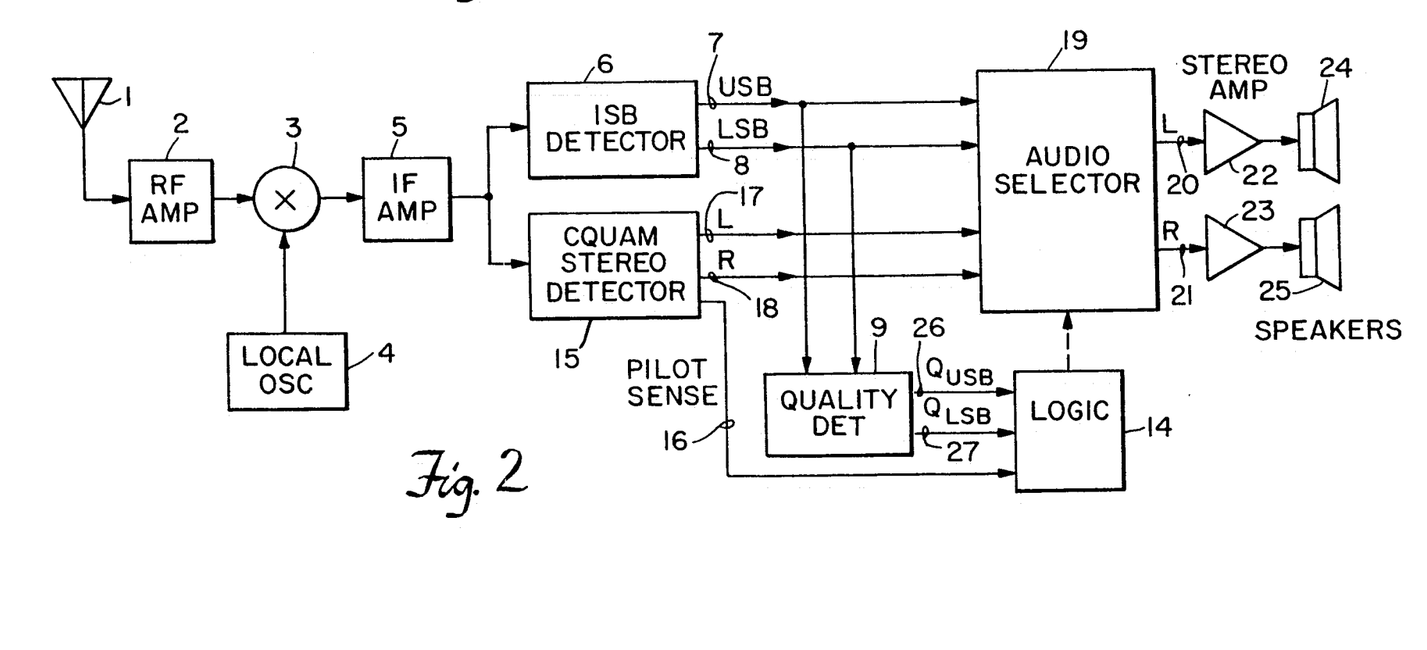
FIG. 2 is a block diagram of a stereophonic receiver according to the invention.

Referring to FIG. 2, there is shown a block diagram of an embodiment of a stereo receiving system in accordance with the invention. This system also comprises radio receiving antenna 1, radio frequency amplifier 2, mixer 3, local oscillator 4, intermediate frequency amplifier 5 and independent sideband detector 6 as in FIG. 1. The outputs of independent sideband detector 6 are also upper sideband audio signal on line 7 and lower sideband audio signal on line 8. These signals are delivered to quality detector 9 and audio selector 19.

The output of intermediate frequency amplifier 5 is also connected to CQUAM stereo detector 15, that provides left stereo signal on line 17, right stereo signal on line 18 and pilot sense signal on line 16. Pilot sense signal on line 16 is delivered to logic element 14. The outputs of the quality detector 9, upper sideband quality signal on line 26 and lower sideband quality signal on line 27, are also delivered to logic element 14. The output of logic element 14 is coupled to audio selector 19. The left and right stereo signals on lines 17 and 18 are also delivered to audio selector 19. Audio selector 19 provides left audio signal on line 20 and right audio signal on line 21. These signals energize left and right amplifiers 22 and 23 that drive left and right speakers 24 and 25.

Figure 3:
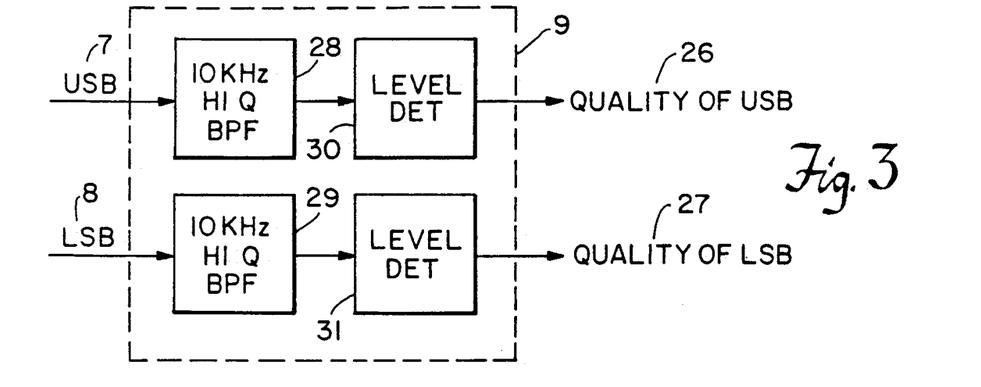
FIGS. 3–5 are block diagrams of embodiments of quality detectors according to the invention.

Referring to FIG. 3, there is shown a block diagram of an embodiment of quality detector 9 of FIGS. 1 and 2. The inputs to quality detector 9 are the upper sideband audio signal on line 7 and the lower sideband audio signal on line 8. These signals are filtered by two 10 kHz high Q bandpass filters 28 and 29. The outputs of the bandpass filters are connected to upper and lower level detectors 30 and 31 to provide upper sideband quality signal on line 26 and lower sideband quality signal on line 27.

Figure 4:
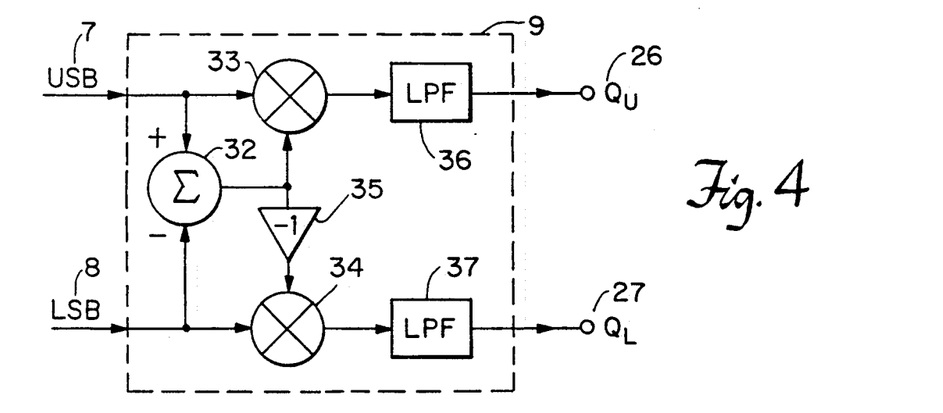

Referring to FIG. 4, there is shown a block diagram of an alternative embodiment of quality detector 9. The inputs to the quality detector 9 are the upper sideband audio signal on line 7 and the lower sideband audio signal on line 8. These signals are fed to differencing amplifier 32 and to upper and lower multipliers 33 and 34.

The output of differencing amplifier 32 is connected to the inputs of upper and lower sideband multiplier 33 and 34, directly and through inverting amplifier 35, respectively. The output of upper sideband multiplier 33 is fed to low pass filter 36. The output of low pass filter 36 is the upper sideband quality signal on line 26. The output of lower sideband multiplier 34 is fed to low pass filter 37. The output of low pass filter 37 is the lower sideband quality signal on line 27.

Figure 5:
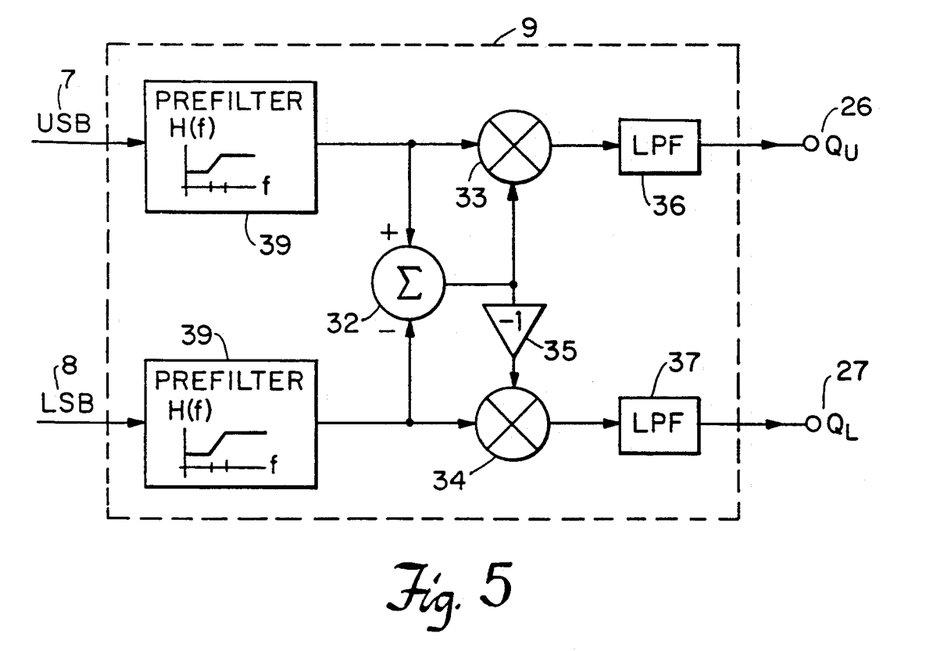

Referring to FIG. 5, there is shown another alternative embodiment of quality detector 9. Upper sideband audio signal on line 7 and lower sideband audio signal on line 8 are fed to prefilters 39 which emphasize the high frequency components of these signals. The outputs of the prefilters are used in the place of the sideband audio signals in circuitry identical to that of FIG. 4.

Figure 6:
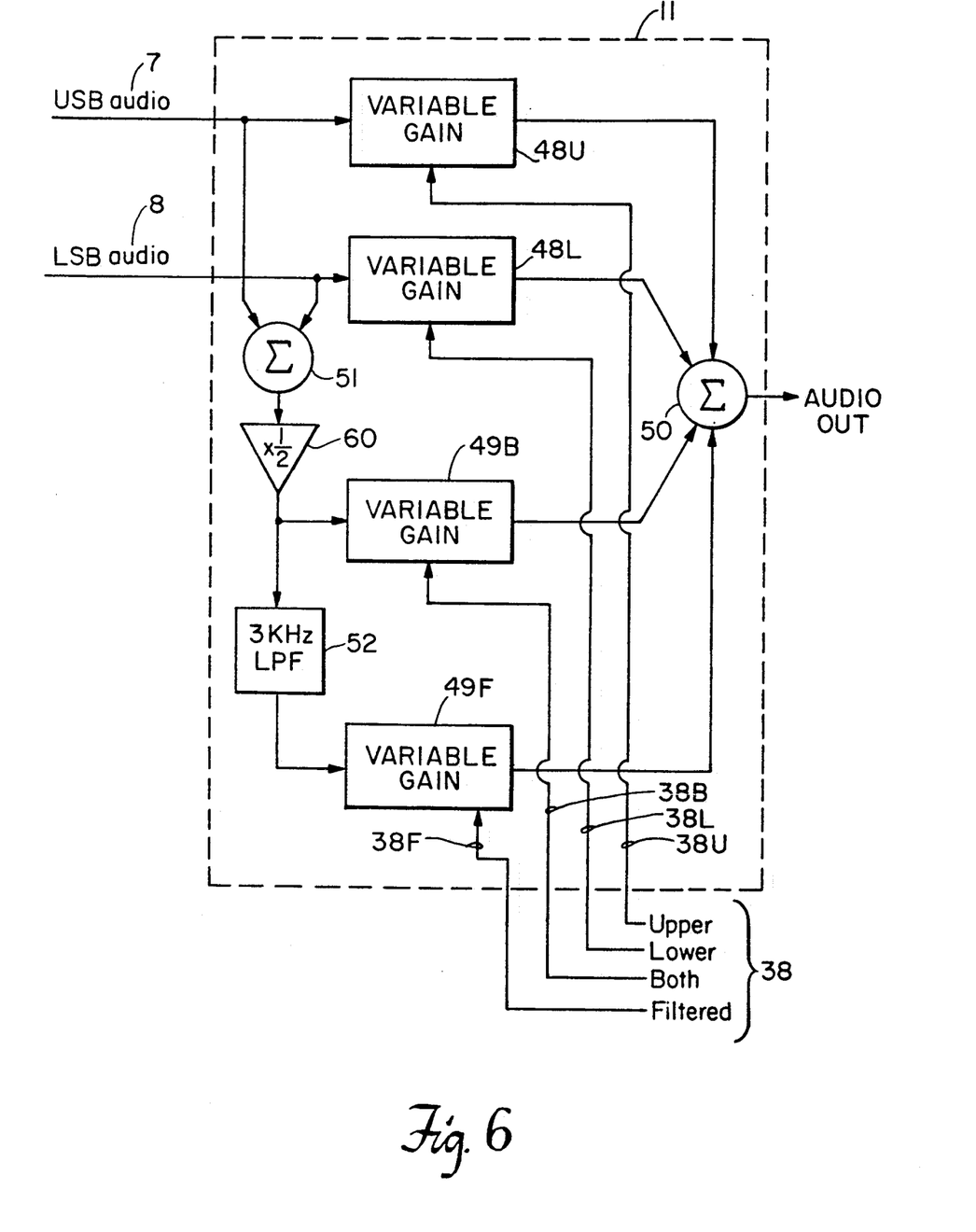
FIG. 6 is a block diagram of an embodiment of an audio selector according to the invention.

Referring to FIG. 6, there is shown a block diagram of an embodiment of the monophonic audio selector 11 of FIG. 1. Upper and lower audio sideband signals on lines 7 and 8 are connected to upper and lower variable gain sections 48U and 48L. Variable gain sections 48 are controlled by upper and lower logic signals on lines 38U and 38L from logic element 10 (FIG. 1).

Upper and lower audio sideband signals on lines 7 and 8 are also summed in summer 51. The output of summer 51 is multiplied by ½ by amplifier 60, which feeds two variable gain sections 49B and 49F. Variable gain section 49B receives the summed signal from amplifier 60. Variable gain section 49F receives the summed signal from amplifier 60 attenuated by 3 kHz low-pass filter 52. Variable gain sections 49B and 49F receive BOTH and FILTERED logic signals on lines 38B and 38F from logic element 10. The outputs of variable gain sections 48U, 48L, 49B, and 49F are summed in summer 50 to provide the audio output.

Figure 7:
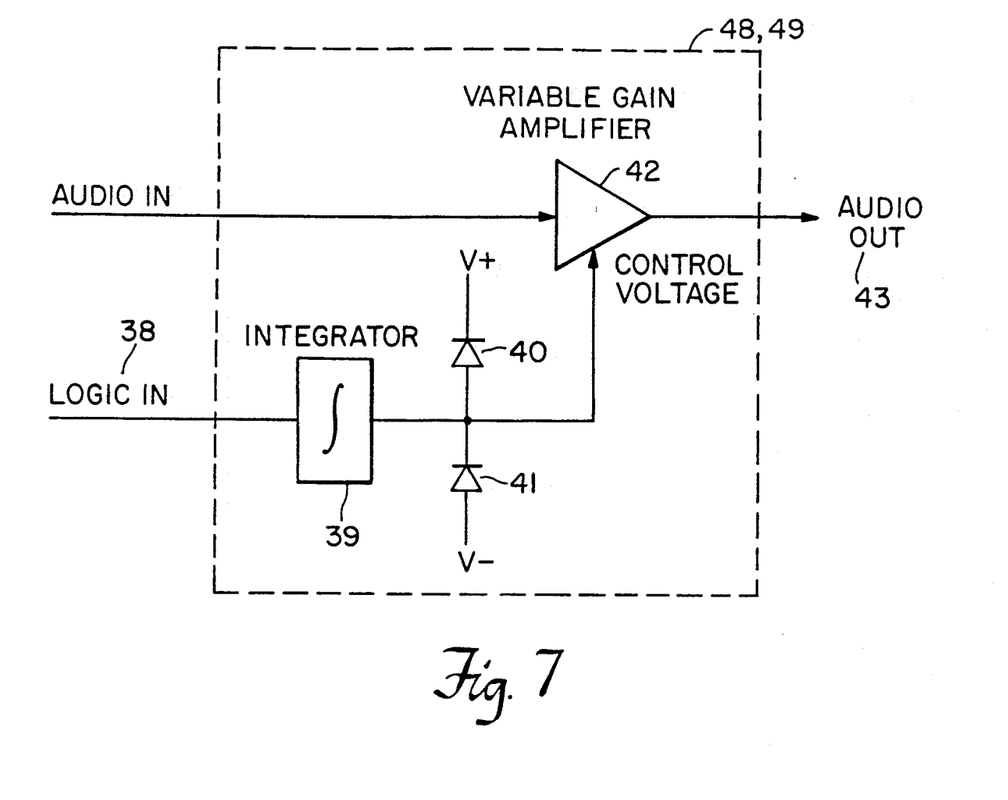
FIG. 7 is a block diagram of an embodiment of a variable gain section according to the invention.

Referring to FIG. 7, there is shown a block diagram of a variable gain section 48, 49. A logic signal on a line 38 energizes integrator 39. The output of integrator 39 is connected to the control voltage input of variable gain amplifier 42. The control voltage is limited to a range between two rail voltages $V_+$ and $V_-$ by limiter diodes 40, 41. The audio input signal is fed to the signal input of the variable gain amplifier 42 to provide audio output signal on line 43.

Figure 8:
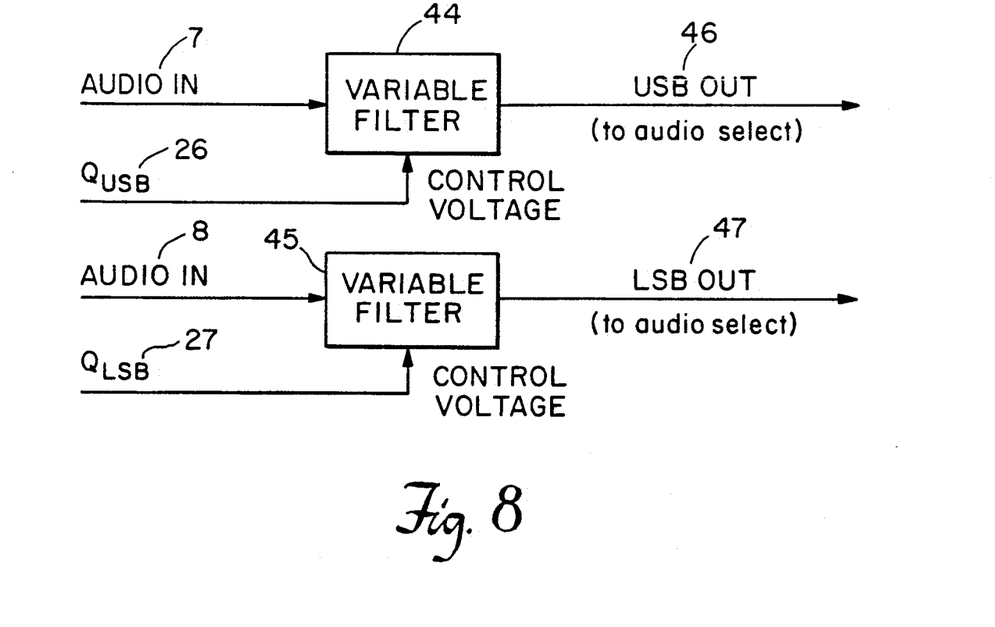
FIG. 8 is a block diagram of apparatus for selectively filtering the sideband signals.

Referring to FIG. 8, there is shown a block diagram of apparatus for selectively filtering the sideband signals. Upper variable filter 44 and lower variable filter 45 receive upper sideband audio signal on line 7 and lower sideband audio signal on line 8, respectively, and as control signals upper sideband quality signal on line 26 and lower sideband quality signal on line 27, respectively. Upper and lower variable filters 44 and 45 provide filtered upper and lower sideband audio output signals on lines 46 and 47, respectively.

Figure 9:
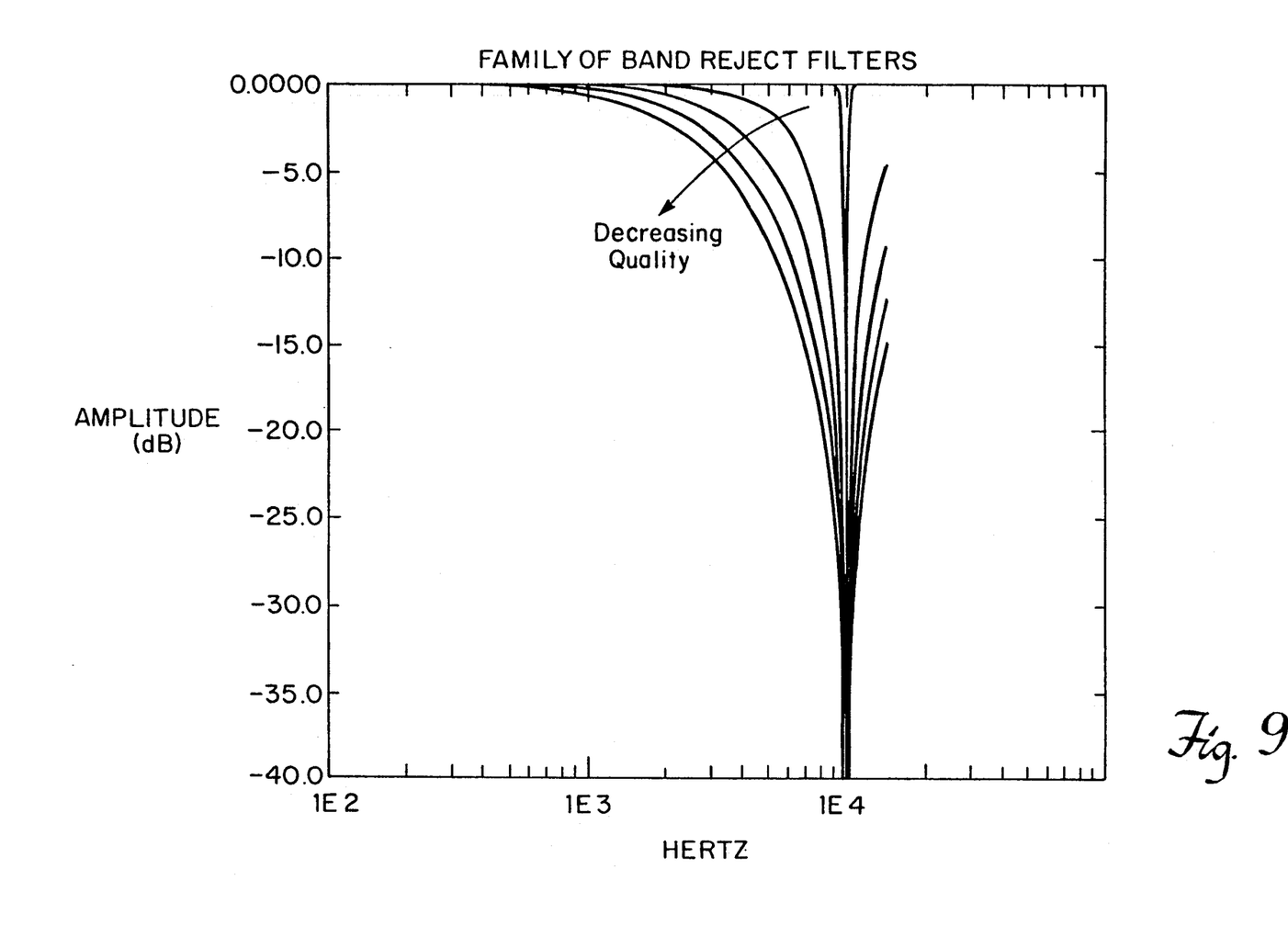
FIG. 9 is a family of frequency responses for the selective filter of FIG. 8.

The quality signals on lines 26 and 27 control the transfer characteristics of variable filters 44 and 45. Referring to FIG. 9, there is shown a family of variable filter transfer characteristics. The cutoff frequency of filters 44 and 45 decreases with decreasing quality.

Figure 10:
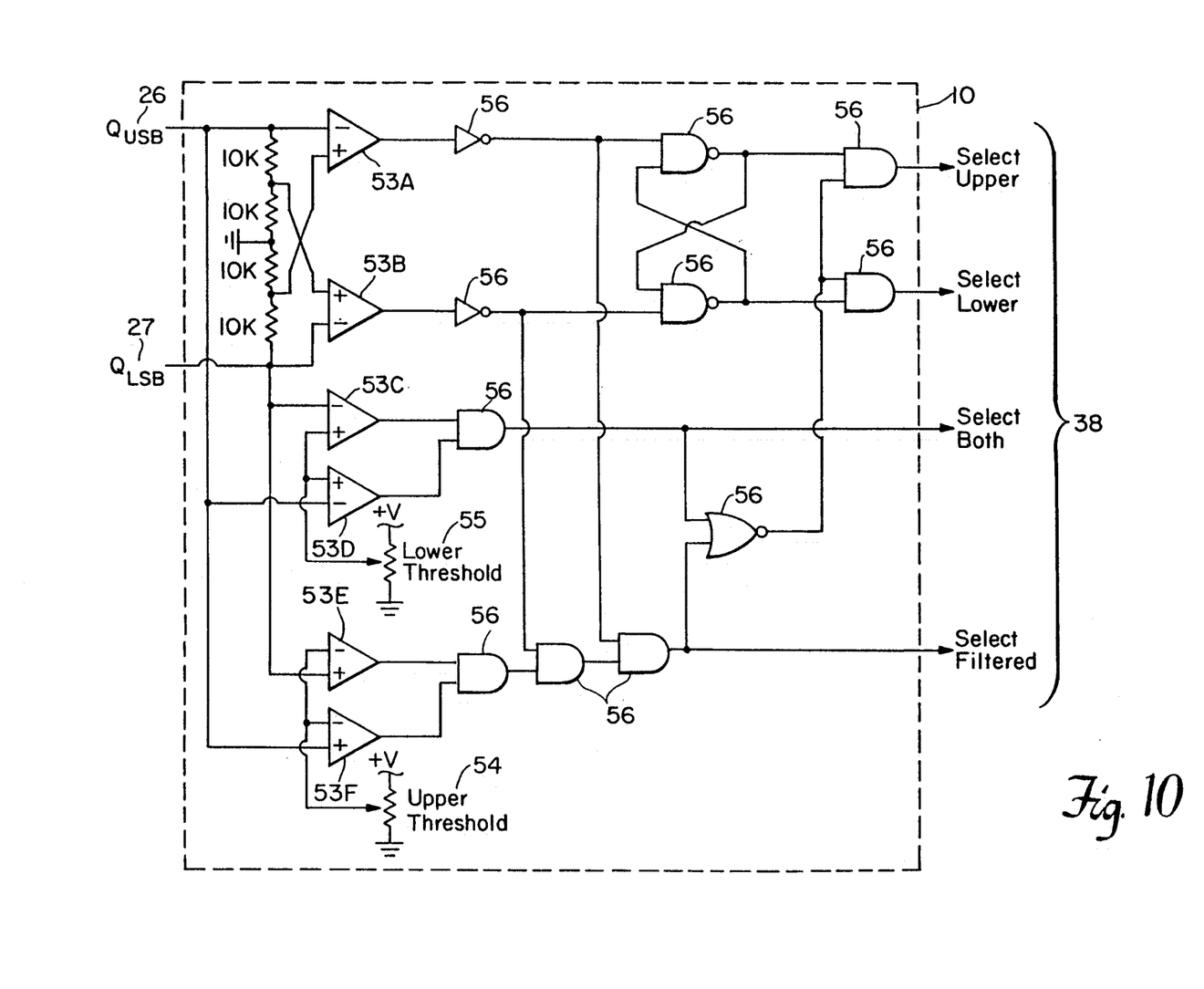
FIG. 10 is a diagram of an embodiment of a logic element according to the invention.

Referring to FIG. 10, there is shown a diagram of an embodiment of logic element 10. Upper sideband quality signal on line 26 energizes "−" inputs of comparators 53A and 53D and "+" input of comparator 53F. Lower sideband quality signal on line 27 energizes "−" inputs of comparators 53B and 53C and "+" input of comparator 53E. Comparators 53C and 53D compare quality signals on lines 26 and 27 to a lower threshold provided by potentiometer 55. Comparators 53E and 53F compare quality signals on lines 26 and 27 to an upper threshold provided by potentiometer 54. Comparators 53A and 53B compare each quality signal to ½ of the other quality signal. The outputs of comparators 53 are processed by logical elements 56 to provide control signals on lines 38. This logical circuitry functions to select both sidebands when channel noise is low, the quiet sideband when only one sideband is noisy, and filtered sidebands when both are noisy.

Figure 11:
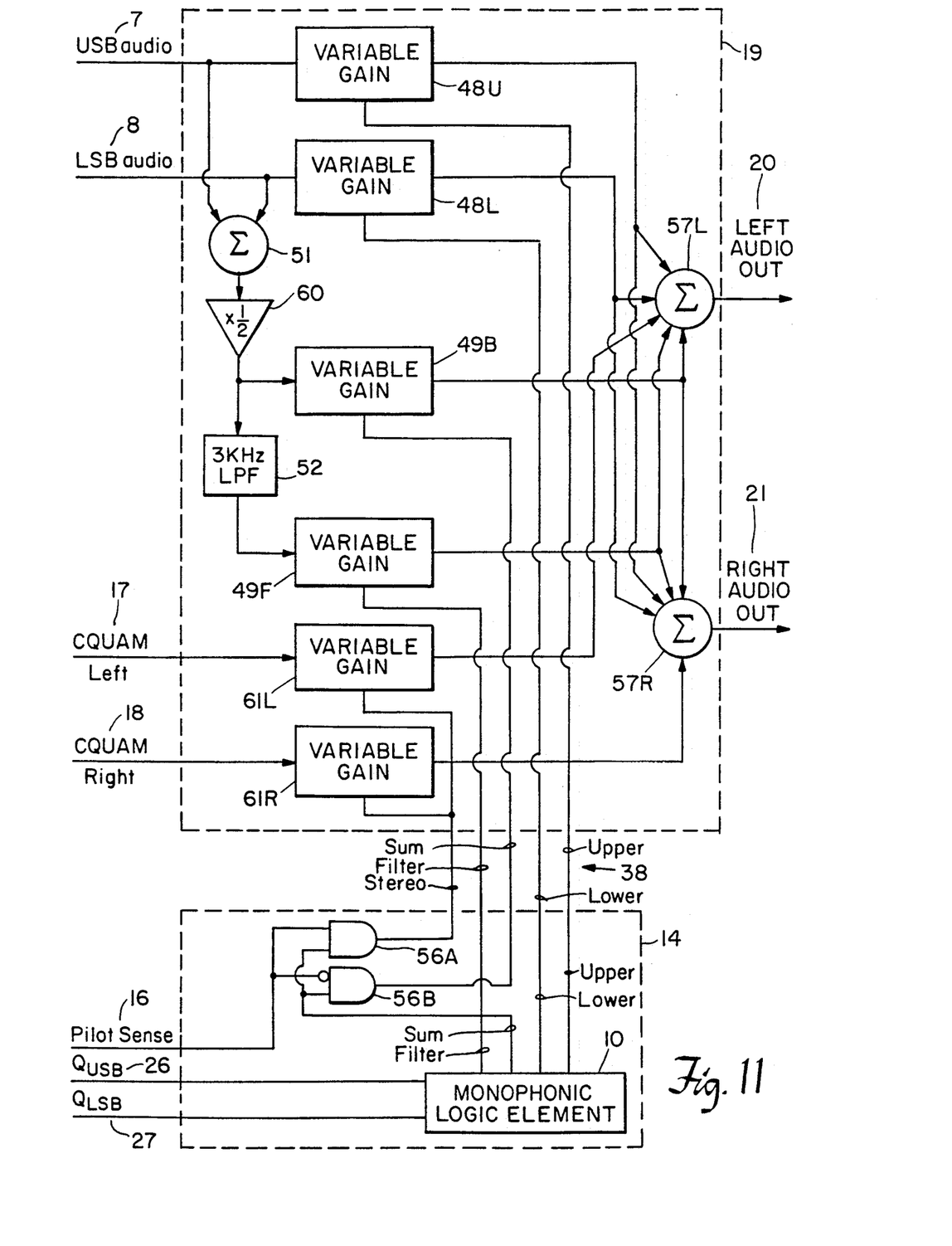
FIG. 11 is a block diagram of a logic element and audio selector for a stereophonic receiver according to the invention.

Referring to FIG. 11, there is shown a block diagram of an embodiment of logic device 14 and audio selector 19 of FIG. 2. Logic element 14 contains the circuitry of logic element 10 of FIG. 10. Additionally, pilot sense input on line 16 is connected to logic gates 56A and 56B to produce stereo and sum control signals 38, respectively. The selection apparatus 19 contains variable gain sections 48 and 49, summer 51, gain amplifier 60, and 3 KHz filter 52 as in FIG. 6. In addition, selection apparatus 19 has left and right output summers 57L and 57R, respectively, for combining signals from variable gain sections 48, 49, 61 to produce left and right stereo output signals on lines 20 and 21, respectively. The left and right stereo input signals on lines 17 and 18 from CQUAM decoder 15 energize variable gain sections 61L and 61R, respectively, with gain controlled by a "stereo" signal from gate 56A.

Figure 12:
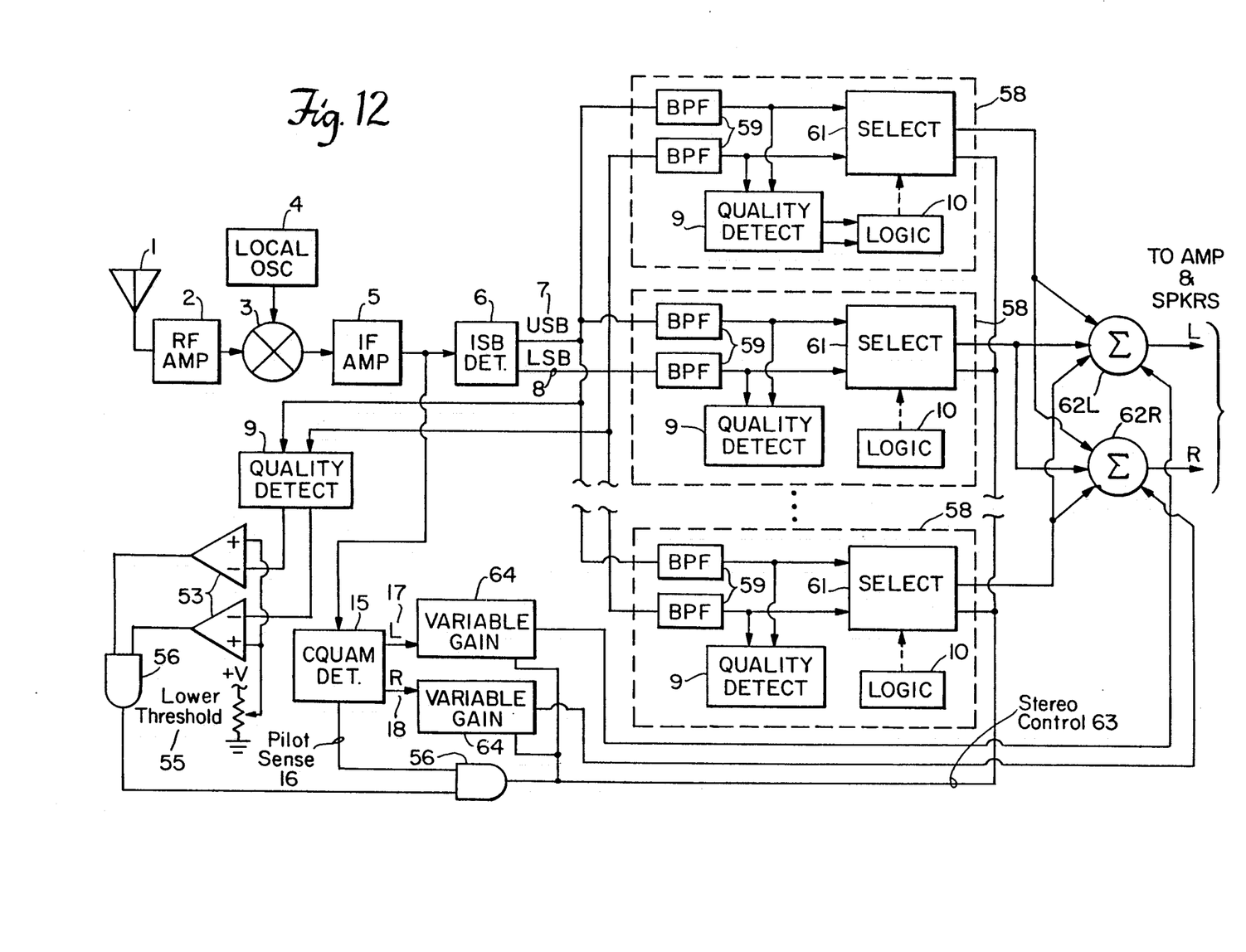
FIG. 12 is a block diagram of a multi-band receiver according to the invention.

Referring to FIG. 12, there is shown a block diagram of a multi-band stereophonic receiver. The receiver includes antenna 1, RF amplifier 2, mixer 3, local oscillator 4, IF amplifier 5, ISB detector 6 and CQUAM decoder 15 as in FIG. 2. Demodulated upper and lower sidebands on lines 7 and 8, respectively, feed a quality detector 9 and a plurality of bandlimited signal processing systems 58. Quality detector 9 is connected to two comparators 53 which compare the quality signals to a lower threshold signal set by potentiometer 55. The comparator outputs are processed by logic gates 56 in conjunction with CQUAM pilot sense signal on line 16 to produce stereo control signal on line 63. Stereo control signal on line 63 controls band-limited signal processing systems 58 and two variable gain sections 64. The inputs of variable gain sections 64 are connected to the signal outputs of CQUAM decoder 15 to provide stereo signals when the quality of the detected signal is satisfactory.

In band-limited systems 58, the upper and lower sideband audio signals on lines 7 and 8, respectively, are filtered by bandpass filters 59. The outputs of bandpass filters 59 are connected to quality detectors 9 and audio selectors 61. The quality detectors 9 control the selection circuits 61 through logic elements 10 to pass the cleaner sideband signal.

The outputs of the band-limited systems 58 are combined with the outputs of the variable gain stages 64 in left and right summers 62L and 62R, respectively, to provide left and right output signals, respectively, which energize left and right stereo amplifiers and speakers, not shown.

Figure 13:
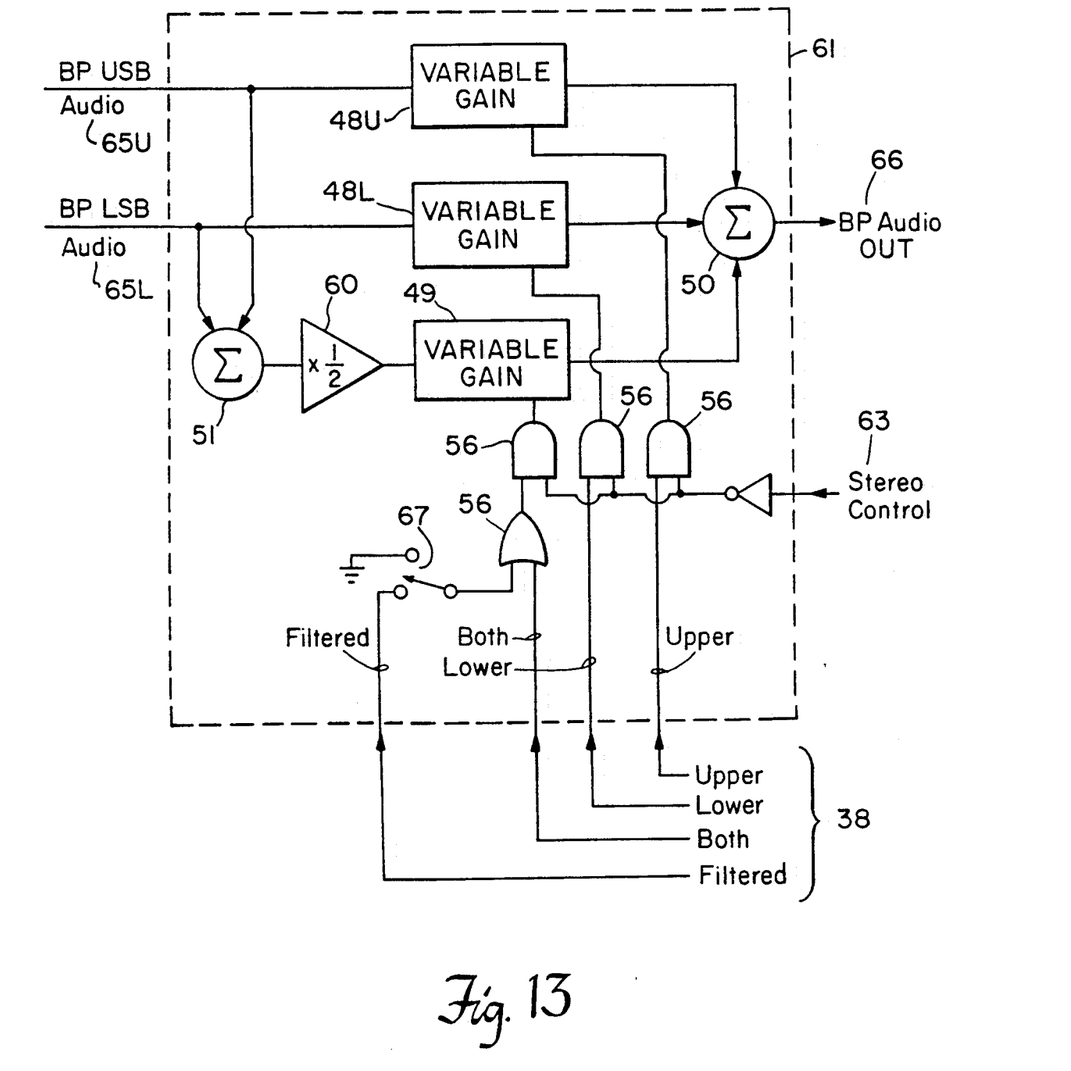
FIG. 13 is a block diagram of a selector for the multi-band receiver of FIG. 12.

Referring to FIG. 13, there is shown a block diagram of a selection apparatus 61. Band-passed upper and lower sideband signals on lines 65U and 65L, respectively, feed upper and lower variable gain sections 48U and 48L, respectively, and summer 51 as in FIG. 6. The output of summer 51 feeds to variable gain section 49 through amplifier 60. The outputs of variable gain sections 48U, 48L, and 49 are combined in summer 50 to produce bandpassed output on line 66. Variable gain stages 48U, 48L, and 49 are controlled by the indicated logic signals on lines 38 and the stereo control signal on line 63.

Operation

Having described structural arrangements, the mode of operation will be described. The present invention reduces the effects of AM interference, such as that caused by adjacent transmitting stations. In normal AM monophonic broadcasts the upper sideband and lower sideband carry identical information. The recovered audio is identical from either sideband. However, in the presence of interference, it is very likely that the interference on one sideband will be quite different from the interference on the other sideband. For example, there may be an interfering station in the channel located above the carrier frequency of the desired station, but none in the channel located below the desired station. In this case, both the upper and lower sideband signals carry the same desired program audio, but the upper sideband carries noise components not found in the lower sideband.

The invention uses a wide bandwidth independent sideband receiver to receive simultaneously both sidebands. A quality detector and audio selector automatically select the sideband with less noise and discard the other. The audio signal from the selected sideband energizes conventional amplifiers and speakers to provide a wideband monophonic audio program relatively free of the noise and distortion that would be reproduced by a conventional monophonic AM receiver.

The quality detector according to the invention senses the overall correlation of the noise in the sidebands to the signal in the sidebands to provide a signal representative of the quality of the signal in each sideband. The quality detector is able to discriminate between sideband noise and signal because both sidebands carry identical desired signal components, and thus the difference between the sideband signals is necessarily the undesired noise signal.

In stereophonic AM systems, the sidebands may be corrupted by interference in much the same way as in monophonic AM. If both sidebands are free of interference, a conventional CQUAM detector is used to demodulate a full bandwidth stereo signal. If one or the other sideband is corrupted by interference, the noisy sideband is discarded, and the quiet sideband is reproduced. While the monophonic reproduction of one sideband is not identical to the sum of the left and right transmitted audio channel in the CQUAM system, the reduction in noise and interference offsets the imperfect demodulation of the audio. When the quality detection apparatus senses that both sidebands carry significant noise, the system may be operated monophonically, by providing the signal derived from the reconstructed sideband signals to both the left and right output amplifiers.

Referring again to FIG. 1, the improved monophonic receiver includes conventional AM receiver topology through IF amplifier 5. This topology includes a conventional RF amplifier 2, local oscillator 4, mixer 3, and IF amplifier stage 5. The local oscillator 4 is sufficiently free of phase noise to avoid introducing audible noise in the independent sideband detection circuits 6.

The two sidebands in the output of the intermediate frequency amplifier 5 can be independently detected in several well known ways. Two common methods are the filter method and the phasing method. Both of these are outlined in reference texts such as the ARRL Radio Amateur's Handbook. In addition, commonly available integrated circuits can be employed such as that disclosed by Kahn in U.S. Pat. No. 4,641,341. One such method is implemented in the independent sideband detection circuits 6 to produce the demodulated upper and lower sideband signals on lines 7 and 8, respectively.

Upper and lower sideband signals on lines 7 and 8 energize quality detector 9 which provides upper and lower quality signals on lines 26 and 27 respectively, indicative of the amount of undesired noise signal present in each sideband.

There are two exemplary methods of generating this quality signal. The first is shown in block diagram form in FIG. 3. Referring to FIG. 3, the 10 kHz whistle signal in each of the two sidebands is passed by upper and lower 10 kHz high Q bandpass filters 28 and 29, respectively. A sideband having more of this 10 kHz signal present is likely to have higher levels of interference than a sideband having less 10 kHz content. The level of the 10 kHz signal in each sideband is represented by the output signal of upper and lower level detectors 30 and 31, respectively.

Another method for determining the quality of the upper and lower sidebands provides a signal which dynamically indicates the amount of interference present as the modulation of the interfering station changes. This method is embodied in the quality detection circuit shown in FIG. 4. The quality signal circuitry subtracts one sideband audio signal from the other with combiner 32. In a monophonic system in the absence of any interference, two sideband audio signals are identical and their difference approaches zero. In the presence of interference, the difference signal is simply the interference. The two sideband audio signals are each multiplied by the difference signal in upper and lower multipliers 33 and 34, respectively, and the product signals are lowpass-filtered by upper and lower filters 36 and 37, respectively. Inverting gain stage 35 inverts the difference signal before it is applied to lower sideband multiplier 34. This inversion keeps the output sign of the lower sideband multiplier 34 the same as that of the upper sideband multiplier 33.

The outputs of multipliers 33 and 34 measure the correlation between the noise signal and each of the two sideband audio signals. A low level of noise correlation yields a low output from upper and lower filters 26 and 27, and is indicative of a high quality signal. In the presence of noise the output of the filters increase.

For example, consider the case where the upper sideband signal on line 7 is corrupted by noise while the lower sideband signal on line 8 is free of noise. In this example, the difference signal is primarily the noise and interference in the upper sideband signal on line 7. The correlation between this signal and the clean lower sideband audio signal on line 8 will be essentially zero, and the output of lower filter 37 will be small. However, the correlation between the difference signal and the corrupted upper sideband signal on line 7 will be high since the noise appears in both signals. Thus the output of upper lowpass filter 36 will be high. In this manner, the quality of each sideband audio signal can be assessed quantitatively to provide representative upper and lower sideband quality signals on lines 26 and 27.

Upper and lower low pass filters 36 and 37 preferably exclude any normal modulating audio frequencies or any low frequency stereo pilot tones in use. However, their bandwidth is preferably wide enough to follow changes in the interference level that result as a moving receiver (such as in a vehicle) travels through regions of higher and lower interference. A bandwidth on the order of 10 Hz has been used effectively.

A modification of the method discussed above for deriving a quality signal is embodied in the system of FIG. 5. Referring to FIG. 5, upper and lower preemphasis filters 38 receive the upper sideband signal on line 7 and the lower sideband signal on line 8. By emphasizing high frequencies, the prefilters provide signals more representative of the interference in the high frequency portion of the audio band and quality signals better representative of high frequency interference. Because of the high frequency nature of adjacent carrier interference, high frequency information is believed to be more meaningful in sideband selection. A single order shelf filter which begins to rise at 1 kHz and returns to a flat response at 10 kHz has been used satisfactorily as a prefilter.

Referring again to FIG. 1, the quality signals on lines 26 and 27 feed logic device 10 which determines the sideband to be selected by audio selector 11. A suitable logic device 10 is shown in FIG. 10. When both quality signals on lines 26 and 27 are below some lower threshold set by potentiometer 55, both sidebands are essentially free of audible noise. Logic element 10 then causes switching circuitry 11 (FIG. 1) to provide the sum of both sidebands. A "1" at the "select both" output of lines 38 signals this condition. Using the sum produces some signal to noise ratio improvement over that of using either sideband alone.

If one of the quality signals on lines 26 and 27 exceeds the lower threshold, that sideband has audible noise. Logic element 10 then causes audio selector 11 (FIG. 1) to select the sideband audio that is essentially free of audible noise. A "1" on one of the "select lower" and "select upper" outputs of lines 38 identifies the sideband free of noise. If both quality signals exceed the lower threshold, the apparatus selects the sideband audio having less noise.

It may be advantageous to make these thresholds variable, depending on detection of the stereo pilot signal, for example. In receiving a stereo broadcast, it may be desirable to establish a higher value for the lower threshold than for a monophonic broadcast. For a monophonic broadcast, no information is lost when deriving the audio signal from a single sideband. By changing the level of the threshold upon detecting a stereo pilot signal, the receiver may remain in the stereo reception mode for higher levels of interference to continue to provide stereo information that listeners may prefer.

In one embodiment, hysteresis circuitry compares the quality signals, and as shown in FIG. 10, the comparator outputs drive a flip-flop. For the comparators to toggle the flip-flop, one quality signal must exceed the other by 6 dB. If the quality signals are nearly equal, there is no change in sideband selection. This requirement helps avoid numerous selection changes in a short time interval.

If both quality signals exceed a second, higher threshold set by potentiometer 54, both sidebands have high noise levels. In this case, if the quality signals differ by 6 dB, the circuitry still selects the higher quality signal. Otherwise the logic circuit 10 causes switching circuit 11 to select a low-pass filtered sum of the two sidebands. A "1" on the "select filtered" output of lines 38 signals this selection. Thus, when the entire channel is very noisy, the proposed receiver effectively functions as a conventional broadcast receiver with a narrower audio passband.

Since switching between sidebands can occur dynamically and at a relatively fast rate, this system is capable of selecting the better sideband audio as the modulation of the interfering station varies. Thus, in the case of interfering stations both above and below the desired station, the system can select the upper sideband when the interfering station above the desired station has a low interference level and can switch to the lower sideband when the interference level of the upper station increases. The system constantly selects the less noisy sideband according to criteria set forth above.

At times, this switching might create audible artifacts. If neither sideband is noise free, the character of the background noise will change as the selected sideband changes. According to another aspect of the invention, the sideband audio signals are cross-faded when changing the sideband selected to reduce audible switching artifacts. When the logic circuit 10 signals selection of the other sideband, circuitry gradually reduces the level of one sideband while increasing the level of the other. By maintaining the total audio voltage amplitude at an essentially constant level, the program volume perceived by a listener does not appear to change. Since the noise gradually changes from that in the previously selected sideband to that in the newly selected sideband, the change is less noticeable and significantly less objectionable.

A particular embodiment of a circuit which accomplishes this cross-fading is shown in the block diagram of FIG. 7. A logic signal from logic circuitry 10 on line 38 drives an integrating amplifier 39. When the logic signal on line 38 changes state, the integrator output ramps up or down depending on the direction of the state change. The output of integrator 39 controls a variable gain amplifier 42 which varies the level of the associated audio signal. The integrator output is limited to the range between the two power supply rails by diodes 40 and 41. By adjusting variable gain amplifier 42 to have gains of 0 and 1 at the lower and higher rail levels, respectively, when a logic signal changes state, the audio output signal on output 43 fades down to 0 or blooms up to full.

An audio selector 11 using variable gain sections 48 and 49 (FIG. 7) is shown in FIG. 6. The logic signals from logic element 10 on lines 38 control four variable gain sections 48U, 48L, 49B and 49F. Variable gain sections 48U and 48L receive upper and lower sideband audio signals on lines 7 and 8, respectively. Variable gain sections 49F and 49B receive filtered and unfiltered versions of the average of the sideband signals. Summer 50 combines the outputs of all four variable gain sections 48U, 48L, 49B and 49F to produce the output of the selector. When logic device 10 toggles from one "1" output to another, the previously selected signal fades to zero, and the new signal blooms to full. (Note that only one of the four control lines 38 can have a "1" at any one time.) If the logic element toggles between or among two or more "1" levels at a high rate, the corresponding signals are mixed together.

A further modification of the receiver may comprise variable cutoff filters energized by the two sideband audio signals on lines 7 and 8. The variable filters filter each sideband audio according to the associated quality signal as shown in FIG. 8. When the quality signal for one of the sidebands is low, indicative of a sideband with low levels of audible noise, the associated variable filter has essentially no effect. As the quality decreases and the quality signal on line 26 or 27 increases, the associated variable filter first functions as a high Q band reject filter centered at 10 kHz. In this way, the variable filter rejects the 10 kHz whistle without substantially reducing the high frequency content of the audio signal. As the quality signal further increases, indicating greater levels of interference, the Q of the filter decreases to low pass filter the audio signal. The filter then functions as a variable cutoff low pass filter where the filter Q is determined by the level of the quality signal. A family of filter curves characterizing this variable filter is shown in FIG. 9.

Variable filters 44 and 45 allow the second threshold in the logic circuits to be adjusted upwards. In the case where both sidebands have some noise, the variable filtering approach allows individual sidebands to be used with increasing levels of noise before switching to the heavily filtered condition using the sum of both sideband signals.

Referring again to FIG. 2, there is shown an adaption of the improved receiver for AM CQUAM stereo broadcasts. When the receiver is tuned to a CQUAM stereo broadcast (as determined by the presence of a pilot signal on line 16) logic device 14 can enable switching circuitry 19 to select the output of stereo decoder 15.

An embodiment of logic device 14 and switching circuit 19 for CQUAM stereo is shown in FIG. 11. Logic device 14 responds to the pilot sense signal on line 16 to produce a "stereo" signal on lines 38, which enables stereo reception. Stereo reception is only allowed when both sidebands have good quality—indicated by a 1 on the "sum" output of monophonic logic device 10. When stereo reception is enabled, the "stereo" line of control lines 53 carries a "1", and the other control lines each carry "0", so the processed and unprocessed versions of the sidebands on lines 7 and 8 fade to zero, and the CQUAM detector inputs on lines 17 and 18 bloom to full.

The output of selector 19 is separated into left and right outputs 20 and 21, respectively. The processed and unprocessed sideband signals feed both left and right under the control of logic signals on lines 38 as described above. The left and right stereo signals from variable gain sections 61L and 61R energize left and right summers 57L and 57R, respectively, when enabled by a "stereo" signal on a line 38.

Logic device 14 might also use additional signals from the stereo decoder. For example, the AVC voltage developed by the CQUAM decoder 15 measures the radio frequency signal strength, and thus might be used to alter the thresholds at which switching takes place.

In another embodiment of the receiver, CQUAM stereo reception may be maintained under noisy conditions by implementing a CQUAM detector which combines the phase modulated difference signal with a sum signal that has been reconstructed from the sidebands.

The receiver of FIG. 2 may also be modified to receive a Kahn/Hazeltine stereo broadcast by replacing the CQUAM decoder 15 with an appropriate pilot signal sensor. Because the two sidebands are respectively the left and right channel in a Kahn/Hazeltine broadcast, when a stereo broadcast is sensed, the channels can be appropriately selected by suitably modified switching circuitry 19.

If both types of stereo broadcasts may be received, a separate detector may be added to the circuit of FIG. 2 to detect the frequency of the pilot tone. The type of stereo broadcast being received can be determined from the frequency of the pilot tone, and proper action taken.

The system described above may be modified for still higher performance by dividing the audio frequency band into a number of contiguous narrower frequency bands, and providing each frequency band with a full separate system as described above. As an example, such a system might select the audio from 50 Hz to 3 kHz from the upper sideband, 3 kHz to 8 kHz from the lower sideband, and 8 kHz to 10 kHz from the upper sideband based on differing noise levels between sideband components in these frequency bands. Together, the ensemble of bandpass filters provides complete but non-overlapping coverage of the audio band. The filter spacing need not be uniform. Since mid and high frequency noise is more annoying, it may be advantageous to have more filters, each of which is narrow, in the high frequency range than in the low frequency range.

A stereo receiver using this multi-band approach is shown in FIG. 12. (A monophonic receiver may also embody miltiband system.) The upper and lower sideband signals on lines 7 and 8 drive several frequency band processing systems 58, where each system is similar to that of FIG. 1. To allow stereo reception, a quality detector 9 and comparators 53 check for lownoise sidebands. If the sideband noise is low enough for stereo and a pilot signal is present, the outputs 17 and 18 of the CQUAM detector are bloomed in and the outputs of the frequency band processors 58 are faded out. Stereo reception is indicated by a "1" on the stereo control line 63. To achieve stereo reception, this line controls the gain of the CQUAM outputs 17 and 18, and also controls the modified selection devices 61 in the frequency band processors.

A selection device 61 which is responsive to the stereo control signal 63 is shown in FIG. 13. In FIG. 13, the selector output on line 66 can be either band-passed sideband, or the sum of the two. A "1" on the stereo control line 63 fades out all signals. Switch 67 allows the selection device to operate in two different modes. In the first mode, switch 67 connects to ground. In this mode, when the logic device 10 for the band processing system indicates heavy noise on both sidebands, (indicated by a "1" on the "filtered" line 38), the selector output on line 66 fades to zero. In the second mode, switch 67 connects to the "filtered" line 38. In this mode, under heavy interference, the output of the selector will be the sum of the two sideband signals. (Note again that only one line 38 can have a "1".) Thus the position of switch 67 determines whether frequency bands with heavy noise are discarded or simply averaged. In some embodiments, all interfered bands would be discarded. In other embodiments, only high frequency interfered bands would be discarded.

The number of frequency bands used in such a system depends upon the allowable complexity and the cost of the receiver. However, since the system of FIG. 12 can be embodied in one or more integrated circuits, a complex multiband system may be fabricated at reasonable cost.

This invention provides for high fidelity AM reception with reduced noise. Other embodiments are within the scope of the appended claims.

What is claimed is:

1. A receiver for receiving an amplitude modulated signal with upper and lower sidebands carrying a modulating audio signal, said receiver comprising, independent sideband circuitry for providing at least one of upper and lower sideband signals, at least one quality detector for providing a quality signal representative of undesired noise in the upper sideband signal relative to that in the lower sideband signal, and at least one selector responsive to said quality signal for processing that one designated by said quality signal as preferred from the standpoint of faithful reproduction with low audible noise of only said upper sideband signal, only said lower sideband signal and both said upper and lower sideband signals to provide an audio output signal with reduced noise that is a substantially faithful reproduction of said modulating audio signal.

2. The receiver as claimed in claim 1, said quality detector comprising, demodulation circuitry for providing upper and lower sideband audio signals, a combiner for differentially combining the demodulated upper and lower sideband audio signals to provide a noise signal, and a correlator for correlating said noise signal and the demodulated sideband audio signal in each associated sideband to provide said quality signal.

3. The receiver as claimed in claim 2, said quality detector further comprising prefilters responsive to said upper and lower sideband audio signals for providing said noise signal.

4. The receiver as claimed in claim 3, wherein said prefilters are high pass filters.

5. The receiver as claimed in claim 2, wherein said quality detector further comprises low pass filters responsive to said correlator for providing said quality signals.

6. The receiver as claimed in claim 2 wherein said quality detector comprises prefilters responsive to said upper and lower sideband audio signals for providing said quality signals.

7. The receiver as claimed in claim 6, wherein said prefilters are 10 kHz high Q band pass filters.

8. The receiver as claimed in claim 1 wherein said selector comprises a plurality of variable gain amplifiers for amplifying signals related to said at least one of upper and lower sideband signals,
and a summer for combining the outputs of said variable gain amplifiers,
said variable gain amplifiers each having a gain responsive to control signals related to said quality signal.

9. The receiver as claimed in claim 8 and further comprising a logic device responsive to said quality signal for providing said control signals,
said variable gain amplifiers further comprising an integrator integrating said control signals for controlling said variable gain amplifiers.

10. The receiver as claimed in claim 1 and further comprising at least one variable band pass filter responsive to said quality signal and filtering a signal related to said at least one of upper and lower sideband signals,
said selector responsive to the output of said at least one variable band pass filter.

11. The receiver as claimed in claim 1 and further comprising a stereo decoder for decoding a stereo signal and detecting a stereo pilot tone,
said selector being additionally responsive to said detected stereo pilot tone for providing left and right stereo signals.

12. The receiver as claimed in claim 11, wherein said selector further comprises variable gain amplifiers for selecting said left and right stereo signals.

13. The receiver as claimed in claim 12, said selector further comprising,
demodulation circuitry for providing upper and lower sideband audio signals,
a summer for summing said modulated upper and lower sideband audio signals,
a low pass filter for filtering the summed upper and lower sideband audio signals,
variable gain amplifiers for selecting said summed or said filtered and summed upper and lower sideband audio signals.

14. The receiver as claimed in claim 1 and further comprising,
demodulation circuitry for providing upper and lower sideband audio signals,
a plurality of band-pass filters for selectively transmitting spectral components of said demodulated upper and lower sideband audio signals in contiguous frequency bands,
a corresponding plurality of said quality detectors and said selectors each associated with a respective band pass filter,
and a summer for combining the output audio signals provided by said selectors.

15. The receiver as claimed in claim 14 wherein said selectors comprise a plurality of variable gain amplifiers for amplifying signals related to said demodulated upper and lower sideband audio signals,
and a summer for combining the outputs of said variable gain amplifiers,
said variable gain amplifiers each having a gain controlled by control signals related to said quality signals.

16. The receiver as claimed in claim 15 and further comprising logic devices responsive to said quality signals for providing said control signals.

17. The receiver as claimed in claim 14 and further comprising a stereo decoder for decoding a stereo signal and detecting a stereo pilot tone,
said selectors being additionally responsive to the detected stereo pilot tone for providing left and right stereo signals.

18. A receiver for receiving an amplitude modulated signal with upper and lower sidebands, said receiver comprising,
an independent sideband receiver for providing demodulated upper and lower sideband audio signals,
a quality detector for providing upper and lower quality signals representative of undesired noise in said demodulated upper and lower sideband audio signals respectively,
and a selector responsive to said quality signals for processing said upper and lower sideband audio signals to provide an audio output signal with reduced noise,
said quality detector comprising,
a combiner for differentially combining the demodulated upper and lower sideband audio signals to provide a noise signal, and
a correlator for correlating said noise signal and the demodulated sideband audio signal in each associated sideband to provide said quality signals.

19. The receiver as claimed in claim 18, said quality detector further comprising prefilters responsive to said upper and lower sideband audio signals for providing said noise signal.

20. The receiver as claimed in claim 19, wherein said prefilters are high pass filters.

21. The receiver as claimed in claim 18, wherein said quality detector further comprises lower pass filters responsive to said correlator for providing said quality signals.

22. A receiver for receiving an amplitude modulated signal with upper and lower sidebands, said receiver comprising,
an independent sideband receiver for providing demodulated upper and lower sideband audio signals,
a quality detector for providing upper and lower quality signals representative of undesired noise in said demodulated upper and lower sideband audio signals respectively,
and a selector responsive to said quality signals for processing said upper and lower sideband audio signals to provide an audio output signal with reduced noise,
wherein said selector comprises a plurality of variable gain amplifiers for amplifying signals related to said demodulated upper and lower sideband signals,
and a summer for combining the outputs of said variable gain amplifiers,
said variable gain amplifiers each having a gain responsive to control signals related to said quality signals.

23. The receiver as claimed in claim 22 and further comprising a logic device responsive to said quality signals for providing said control signals, said variable gain amplifiers further comprising an integrator integrating said control signals for controlling said variable gain amplifiers.

24. A receiver for receiving an amplitude modulated signal with upper and lower sidebands, said receiver comprising, an independent sideband receiver for providing demodulated upper and lower sideband audio signals, a quality detector for providing upper and lower quality signals representative of undesired noise in said demodulated upper and lower sideband audio signals respectively, a selector responsive to said quality signals for processing said upper and lower sideband audio signals to provide an audio output signal with reduce noise, and variable band pass filters responsive to said quality signals and filtering said demodulated upper and lower sideband audio signals, said selector responsive to the output of said variable band pass filters.

25. A receiver for receiving an amplitude modulated signal with upper and lower sidebands, said receiver comprising, an independent sideband receiver for providing demodulated upper and lower sideband audio signals, a quality detector for providing upper and lower quality signals representative of undesired noise in said demodulated upper and lower sideband audio signals respectively, a selector responsive to said quality signals for processing said upper and lower sideband audio signals to provide an audio output signal with reduced noise, a stereo decoder for decoding a stereo signal and detecting a stereo pilot tone, said selector being additionally responsive to said detected stereo pilot tone for providing left and right stereo signals and comprising, variable gain amplifiers for selecting said left and right stereo signals, a summer for summing said demodulated upper and lower sideband audio signals, a low pass filter for filtering the summed upper and lower sideband audio signals, variable gain amplifiers for selecting said summed or said filtered and summed upper and lower sideband audio signals.

26. A receiver for receiving an amplitude modulated signal with upper and lower sidebands, said receiver comprising, an independent sideband receiver for providing demodulated upper and lower sideband audio signals, a quality detector for providing upper and lower quality signals representative of undesired noise in said demodulated upper and lower sideband audio signals respectively, a selector responsive to said quality signals for processing said upper and lower sideband audio signals to provide an audio output signal with reduced noise, a plurality of band-pass filters for selectively transmitting spectral components of said demodulated upper and lower sideband audio signals in contiguous frequency bands, a corresponding plurality of said quality detectors and said selectors each associated with a respective band pass filter, and a summer for combining the output audio signals provided by said selectors.

27. The receiver as claimed in claim 26 wherein said selectors comprise a plurality of variable gain amplifiers for amplifying signals related to said demodulated upper and lower sideband audio signals, and a summer for combining the outputs of said variable gain amplifiers, said variable gain amplifiers each having a gain controlled by control signals related to said quality signals.

28. The receiver as claimed in claim 27 and further comprising logic devices responsive to said quality signals for providing said control signals.

29. The receiver as claimed in claim 26 and further comprising a stereo decoder for decoding a stereo signal and detecting a stereo pilot tone, said selectors being additionally responsive to the detected stereo pilot tone for providing left and right stereo signals.

30. A method of receiving an amplitude modulated signal with upper and lower sidebands carrying a modulating audio signal which method includes the steps of, processing said amplitude modulated signal to provide at least one of upper and lower sideband signals, processing said amplitude modulated signal to provide a quality signal representative of undesired noise in the upper sideband signal relative to that in the lower sideband signal, responding to said quality signal by processing that one of only said upper side band signal, only said lower sideband signal and both said upper and lower sideband signals to provide an audio output signal with reduced noise that is a substantially faithful reproduction of said modulating audio signal.

31. A method in accordance with claim 30 and further including the steps of, demodulating the upper and lower sideband signals to provide upper and lower sideband audio signals respectively, differentially combining the demodulated upper and lower sideband audio signals to provide a noise signal, and correlating said noise signal and the demodulated sideband audio signal in each associated sideband to provide said quality signal.

* * * * *